B. W. DAVIS.

Assignor of one-half interest to W. LEIGHTON.

NUT-LOCKS.

No. 7,330. Reissued Oct. 3, 1876

Witnesses

Robt Ames

Claudius L. Parker.

Inventor: Benjamin W. Davis.

By George H. Christy, Atty for him and his assignee.

UNITED STATES PATENT OFFICE.

BENJAMIN W. DAVIS, OF KEOKUK, IOWA, ASSIGNOR OF ONE-HALF INTEREST TO WILLIAM LEIGHTON, OF SAME PLACE.

IMPROVEMENT IN NUT-LOCKS.

Specification forming part of Letters Patent No. 136,906, dated March 18, 1873; reissue No. 7,330, dated October 3, 1876; application filed September 11, 1876.

*To all whom it may concern:*

Be it known that I, BENJAMIN W. DAVIS, formerly of Fort Madison, but now of Keokuk, in the State of Iowa, have invented a new and useful Improvement in Device for Locking Nuts; and I do hereby declare that the following is a full, clear, and exact description thereof, reference being had to the accompanying drawing, making a part of this specification, in which—like letters representing like parts—

Figure 1:
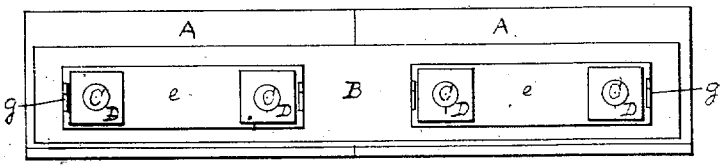
Figure 2:
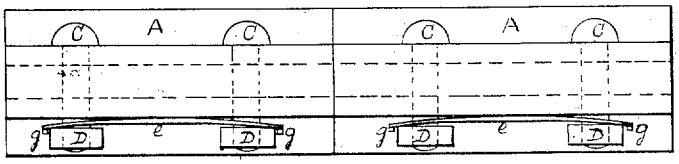
Figure 3:
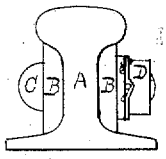
Figure 4:
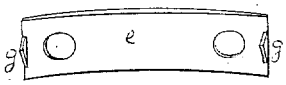

Figure 1 is a side elevation of the adjacent ends of two rails coupled together and furnished with my improvement for locking nuts. Fig. 2 is a top or plan view of the same. Fig. 3 is an end elevation of the same, and Fig. 4 is a detached perspective view of the locking spring-plate.

My invention relates to a nut-lock for railway-track joints, to be used in combination with fish-bars, bolts, and nuts. In applying it I employ a slightly-curved or arched steel spring-plate, arranged with the crown of the arch bearing against the fish-bar, and with a bolt passing through an elongated bolt-hole at each outer end of the spring-plate, and with a nut screwed down on each bolt onto and against the free ends of the spring-plate. This spring-plate is also furnished with a lip or shoulder at each end to prevent the nut from turning.

At A I have shown the adjacent ends of two rails of an ordinary railway-track. The fish-bars B, bolts C, and nuts D are, as represented, of ordinary construction. To provide now for securing the nuts D, as against their tendency to work off or unscrew, I make a spring-plate, *e*, of elastic flexible metal, give it a slight curvature in the direction of its length, and punch the bolt-holes, one at or near each end, and at the proper distance apart. These bolt-holes are, however, to be elongated somewhat in the direction of the length of the plate—that is to say, made longer than the diameter of the bolt to be inserted therein.

As a result of this elongation two elements of utility are attained. First, provision is made for the expansion and contraction of the rail at varying temperatures; and, second, provision is made for the movement of the curved ends of the spring-plate toward and from the fish-bar as the nuts are tightened or loosened. The tension of the spring upon the nuts prevents the rattling of the bolts and jarring of the nuts upon them, and, to the extent of such tension, will prevent the nuts from unscrewing; and, as a further means to the latter end, a raised lip or shoulder, *g*, on the end of each curved spring, bearing against the side of the nut D, prevents it from turning. The lips *g* can be turned up at the end, as shown, or a projection can be made with a punch on the outside of the curved spring, which will accomplish the same result—namely, the holding of the nut, and preventing it from turning on the bolt.

The hereinbefore-described device will securely hold the nuts in the desired position with relation to the bolts and fish-bars, and also prevent the rattling and jarring of the nuts, bolts, and fish-bars during the passage of the wheels of the cars over the fish-joints of railways, and will completely and perfectly compensate for the expansion and contraction of the several parts in consequence of changes of temperature. The inclines of the lip *g* will allow the nut, in screwing it on or off the bolt, to pass over the lip. The nut, in passing up the inclines, will force back the spring *e*, which will return to its position when the sides of the nut are parallel with the longitudinal plane of the lip *g*.

It will be observed that there is no change in the form of the bolts or nuts, nor of the fish-bar, all these being of ordinary construction; also, that, with the construction set forth, the curved spring-plate described has a bearing between the two bolts, and when attached to the two bolts at or near its ends by nuts and oblong slots, the ends of the spring have no connection outside of the bolts, and are free to play to and from the fish-bars as the nuts are tightened and loosened, and also, whether both are screwed down to the same amount, or one more than the other, both ends will bear with a uniform, or nearly uniform, pressure on the nuts.

An important element of utility arises from the fact that only the curved spring-plate is required to be added to the ordinary fish-bar joint to secure an effective lock.

I claim herein as my invention—

1. The arched spring *e*, arranged with the crown of the arch bearing against the fish-bar, said spring having an elongated bolt-hole at or near each outer free end of the arch, whereby, on the turning down of the nuts, the elastic force of the spring will be brought to bear on each nut equally, or nearly so, substantially as and for the purposes set forth.

2. The curved spring *e*, provided with elongated openings for the bolts C, and also provided on its outer ends with vertically-projecting lips *g*, engaging the sides of the nuts, in combination with the ordinarily-constructed nuts D and fish-bar B, substantially as and for the purpose set forth.

BENJAMIN W. DAVIS.

Witnesses:
TIMOTHY F. PHILLIPS,
WILLIAM MCELROY.